US012675611B2

(12) United States Patent
Lin et al.

(10) Patent No.: US 12,675,611 B2
(45) Date of Patent: Jul. 7, 2026

(54) SECURE CONTROL CIRCUIT, OPERATING DEVICE AND METHOD THEREOF

(71) Applicant: Nuvoton Technology Corporation, Hsinchu Science Park (TW)

(72) Inventors: Wei-Ling Lin, Jhubei City (TW); Chia-Hao Huang, Jhubei City (TW); Tsun-Yao Fan, Taipei City (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 15 days.

(21) Appl. No.: 18/794,595

(22) Filed: Aug. 5, 2024

(65) Prior Publication Data

US 2025/0181778 A1    Jun. 5, 2025

(30) Foreign Application Priority Data

Dec. 5, 2023    (TW) ................................. 112147181

(51) Int. Cl.
*G06F 21/76* (2013.01)
*G06F 21/00* (2013.01)

(52) U.S. Cl.
CPC .................................... *G06F 21/76* (2013.01)

(58) Field of Classification Search
CPC .......... G06F 21/76; G06F 21/78; G06F 21/71; G06F 21/60; G06F 21/604; G06F 21/62; G06F 21/6209
See application file for complete search history.

(56) References Cited

U.S. PATENT DOCUMENTS

2005/0005081 A1* 1/2005 Ehama ................ G06F 12/1425
711/E12.099
2008/0120695 A1* 5/2008 Tirosh .................. H04L 63/105
726/3

* cited by examiner

*Primary Examiner* — Edward Zee
(74) *Attorney, Agent, or Firm* — MUNCY, GEISSLER, OLDS & LOWE, P.C.

(57) ABSTRACT

A secure control circuit protects data stored in a memory is provided. A setting circuit provides a first activation signal and protection information. The protection information points to a confidential area of the memory. A processing circuit provides a second activation signal and access information. An arbiter determination circuit determines whether the access information points to the confidential area according to the protection information in response to the first activation signal being in a first level. In response to the second activation signal not being in a specific level and the access information points to the confidential area, the arbiter determination circuit directs an access circuit to access the confidential area. In response to the second activation signal being in the specific level and the access information points to the confidential area, the arbiter determination circuit directs the access circuit to stop accessing the confidential area.

18 Claims, 5 Drawing Sheets

500

SECURE CONTROL CIRCUIT, OPERATING DEVICE AND METHOD THEREOF

CROSS REFERENCE TO RELATED APPLICATIONS

This application claims priority of Taiwan Patent Application No. 112147181, filed on Dec. 5, 2023, the entirety of which is incorporated by reference herein.

BACKGROUND OF THE INVENTION

Field of the Invention

The present invention relates to a secure control circuit, and, in particular, to a secure control circuit that protects important data.

Description of the Related Art

The types and functions of electronic devices have increased due to technological development. Most electronic devices have at least one memory to store data. If important data is not protected, there is a risk that this important data may be stolen and leaked.

BRIEF SUMMARY OF THE INVENTION

In accordance with an embodiment of the disclosure, a secure control circuit protects data stored in a memory and comprises a setting circuit, a processing circuit, an arbiter determination circuit, and an access circuit. The setting circuit sets a first activation signal according to initial setting information and provides protection information. The protection information points to a confidential area of the memory. The processing circuit sets a second activation signal and provides access information. The arbiter determination circuit determines whether the access information points to the confidential area according to the protection information in response to the first activation signal being in a first level. The access circuit is coupled between the arbiter determination circuit and the memory. In response to the second activation signal not being in a specific level and the access information pointing to the confidential area, the arbiter determination circuit directs the access circuit to access the confidential area. In response to the second activation signal being in the specific level and the access information pointing to the confidential area, the arbiter determination circuit directs the access circuit to stop accessing the confidential area.

In accordance with another embodiment of the disclosure, an operating device comprises a memory and a secure control circuit. The memory comprises a confidential area. The secure control circuit protects the confidential area and comprises a setting circuit, a processing circuit, an arbiter determination circuit, and an access circuit. The setting circuit sets a first activation signal according to initial setting information and provides protection information. The protection information points to the confidential area. The processing circuit sets a second activation signal and provides access information. The arbiter determination circuit determines whether the access information points to the confidential area according to the protection information in response to the first activation signal being in a first level. The access circuit is coupled between the arbiter determination circuit and the memory. In response to the second activation signal not being in a specific level and the access information pointing to the confidential area, the arbiter determination circuit directs the access circuit to access the confidential area. In response to the second activation signal being in the specific level and the access information pointing to the confidential area, the arbiter determination circuit directs the access circuit to stop accessing the confidential area.

An operating method for protecting a confidential area of a memory is provided. An exemplary embodiment of the operating method is described in the following paragraph. A determination is made as to whether a first activation signal is in a first level. In response to the first activation signal being in the first level, a determination is made as to whether a second activation signal is in a specific level. In response to the second activation signal not being in the specific level, a determination is made as to whether access information points to the confidential area. In response to the access information not pointing to the confidential area, the memory is accessed according to the first access information. In response to the access information pointing to the confidential area and the access information being provided by a connection interface, the accessing of the memory is stopped. In response to the first activation signal being in the first level and the second activation signal being in the specific level, a determination is made as to whether a second access information points to the confidential area. In response to the second access information pointing to the confidential area, the accessing of the memory is stopped. In response to the second access information not pointing to the confidential area, the memory is accessed according to the second access information.

Operating methods may be practiced by the systems which have hardware or firmware capable of performing particular functions and may take the form of program code embodied in a tangible media. When the program code is loaded into and executed by an electronic device, a processor, a computer or a machine, the electronic device, the processor, the computer or the machine becomes a secure control circuit and an arbiter determination circuit for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
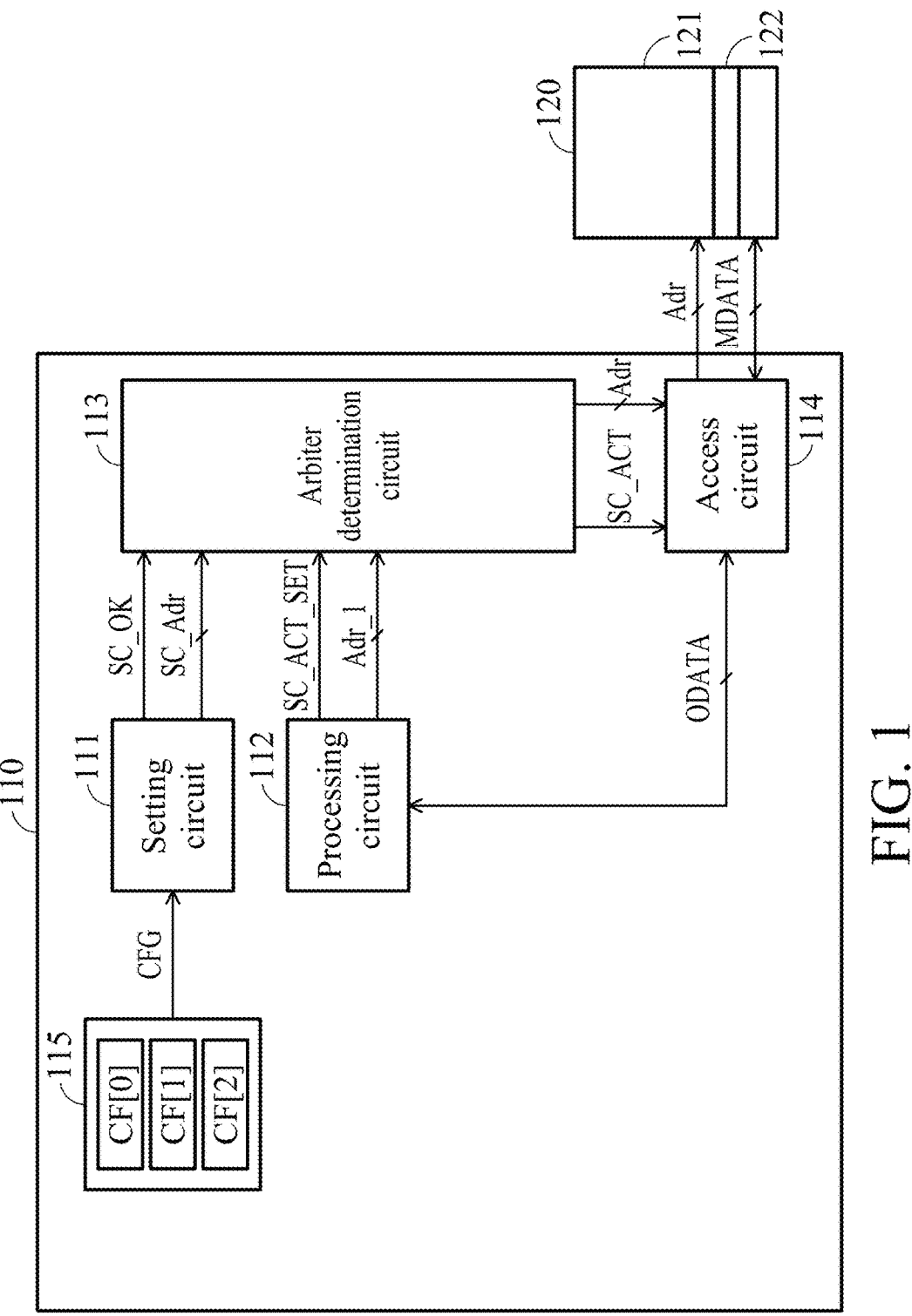
FIG. 1 is a schematic diagram of an exemplary embodiment of an operating device according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operating device according to various aspects of the present disclosure. As shown in FIG. 1, the operating device 100 comprises a secure control circuit 110 and a memory 120. The secure control circuit 110 designates a memory area 122 of the memory 120 as a confidential area. When a secure conceal function is enabled, the secure control circuit 110 does not access the memory area 122. Therefore, the program code in the memory area 122 cannot be read or executed. When the secure conceal function is released, the secure control circuit 110 synchronously erases the program code in the memory area 122. Therefore, the data security of the memory area 122 is greatly improved.

In some embodiment, the program code in the memory area 122 is a one-time program code. When the operating device 100 is powered on, the program code in the memory area 122 is executed once. Therefore, even if the program code in the memory area 122 is erased, it does not affect the operation of the operating device 100 and the program code in the memory area 122 is not stolen. Furthermore, when the secure conceal function is enabled, the secure control circuit 110 does not read the memory area 122 and does not erase the program code in the memory area 122. Therefore, the number of times of erasing the memory 120 can be reduced and the life of the memory 120 can be increased. The type of memory 120 is not limited in the present disclosure. In one embodiment, the memory 120 is a non-volatile memory (NVM).

In this embodiment, the secure control circuit 110 comprises a setting circuit 111, a processing circuit 112, an arbiter determination circuit 113, and an access circuit 114. The setting circuit 111 sets the memory area 122 as a confidential area according to an initial setting information CFG and serves the relevant information of the memory area 122 as protection information SC_Adr. In some embodiments, the protection information SC_Adr comprises the starting address of the memory area 122 and the size of the memory area 122.

The form of the initial setting information CFG is not limited in the present disclosure. In one embodiment, the initial setting information CFG comprises setting parameters CF[0] and CF[1]. The setting parameter CF[0] indicates the starting address of a confidential area. The setting parameter CF[1] indicates the size of the confidential area. When the setting parameter CF[0] corresponds to the starting address of the memory area 122 and the setting parameter CF[1] corresponds to the size of the memory area 122, the setting circuit 111 designates the memory area 122 of the memory 120 as a confidential area according to the setting parameters CF[0] and CF[1].

In another embodiment, the initial setting information CFG further comprises a setting parameter CF[2]. The setting parameter CF[2] indicates whether a secure conceal function is enabled. In this case, the setting circuit 111 sets an activation signal SC_OK according to the setting parameter CF[2]. For example, when the setting parameter CF[2] is equal to a first value (e.g., the value 1), it is determined that a secure conceal function is enabled. Therefore, the setting circuit 111 sets the activation signal SC_OK in a first level. When the setting parameter CF[2] is equal to a second value (e.g., the value 0), it is determined that a secure conceal function is not enabled. Therefore, the setting circuit 111 sets the activation signal SC_OK in a second level. In this embodiment, the second level is opposite to the first level. For example, when the first level is a high level, the second level is a low level. When the first level is a low level, the second level is a high level.

In other embodiments, the secure control circuit 110 further comprises a storage circuit 115. The storage circuit 115 stores the setting parameters CF[0]~CF[2]. The initial setting information CFG may comprise more or fewer setting parameters. The initial setting information CFG may have other numbers of setting parameters as long as the information provided by the initial setting information CFG allows the setting circuit 111 to select a specific area of the memory 120 and use the specific area as a confidential area. In some embodiments, the initial setting information CFG comprises a first setting parameter and a second setting parameter. The first setting parameter is used to indicate the starting address of the confidential area. The second setting parameter is used to indicate the end address of the confidential area.

The processing circuit 112 sets an activation signal SC_ACT_SET. When the activation signal SC_ACT_SET is in a third level, this indicates that the secure conceal function is enabled. When the activation signal SC_ACT_SET is in a fourth level, this indicates that the secure conceal function is not enabled. In this embodiment, the fourth level is opposite to the third level. For example, when the third level is a high level, the fourth level is a low level. When the third level is a low level, the fourth level is a high level. Additionally, the third level may be the same as or different from the first level. Similarly, the fourth level may be the same as or different from the second level. In other embodiments, the processing circuit 112 further provides access information Adr_1 to indicate the address of the memory 120 to be accessed.

The arbiter determination circuit 113 controls the access circuit 114 according to the activation signals SC_OK and SC_ACT_SET. For example, when the activation signal SC_OK is in a first level and the activation signal SC_ACT_SET is in a third level, it is determined that the secure conceal function is enabled. At this time, when the access information Adr_1 points to the memory area 122, the arbiter determination circuit 113 directs the access circuit 114 to stop accessing the memory area 122. However, when access information Adr_1 does not point to the memory area 122, this indicates that the processing circuit 112 wants to access non-protected memory area, such as the memory area 121. Therefore, the arbiter determination circuit 113 allows the access circuit 114 to access the memory 120 according to the access information Adr_1.

When the activation signal SC_OK is in a second level, this indicates that the secure conceal function is not enabled. Therefore, the arbiter determination circuit 113 directs the access circuit 114 to access the memory 120 according to the access information Adr_1. For example, when the access information Adr_1 points to the memory area 121 or 122, the access circuit 114 accesses the memory area 121 or 122. Similarly, when the activation signal SC_ACT_SET is in a fourth level, this indicates that the secure conceal function is not enabled. Therefore, the arbiter determination circuit 113 directs the access circuit 114 to access the memory 120 according to the access information Adr_1.

The invention does not limit how the arbiter determination circuit 113 directs the access circuit 114. In one embodiment, the arbiter determination circuit 113 uses a activation signal SC_ACT to direct the access circuit 114. For example, when the arbiter determination circuit 113 does not enable the activation signal SC_ACT, this indicates that the arbiter determination circuit 113 hopes the access circuit 114 to access the memory 120. When the arbiter determination circuit 113 enables the activation signal SC_ACT, this indicates that the arbiter determination circuit 113 hopes the access circuit 114 to stop accessing the memory 120. At this time, since the access information Adr_1 may be an illegal access request, the access circuit 114 stops accessing the memory 120. In one embodiment, when the arbiter determination circuit 113 does not enable the activation signal SC_ACT, the access circuit 114 may sets the output data ODATA to a predetermined value, such as a series of values 0, a series of values 1, or a random code Additionally, the arbiter determination circuit 113 outputs the access information Adr_1 to the access circuit 114. The access circuit 114 determines whether to access the memory 120 according to the activation signal SC_ACT. When the activation signal SC_ACT is not enabled, the access circuit 114 executes a read operation or a write operation according to the access information Adr_1.

For example, when the access information Adr_1 has a read command, the access circuit 114 reads the data MDATA stored in the memory 120 according to the address information of the access information Adr_1. The access circuit 114 processes the data MDATA to generate output data ODATA and provides the output data ODATA to the processing circuit 112. When the access information Adr_1 has a write command, the access circuit 114 processes output data ODATA provided by an external device to generate the output data MDATA. The access circuit 114 writes the data MDATA in the memory 120 according to the address information of the access information Adr_1.

Figure 2:
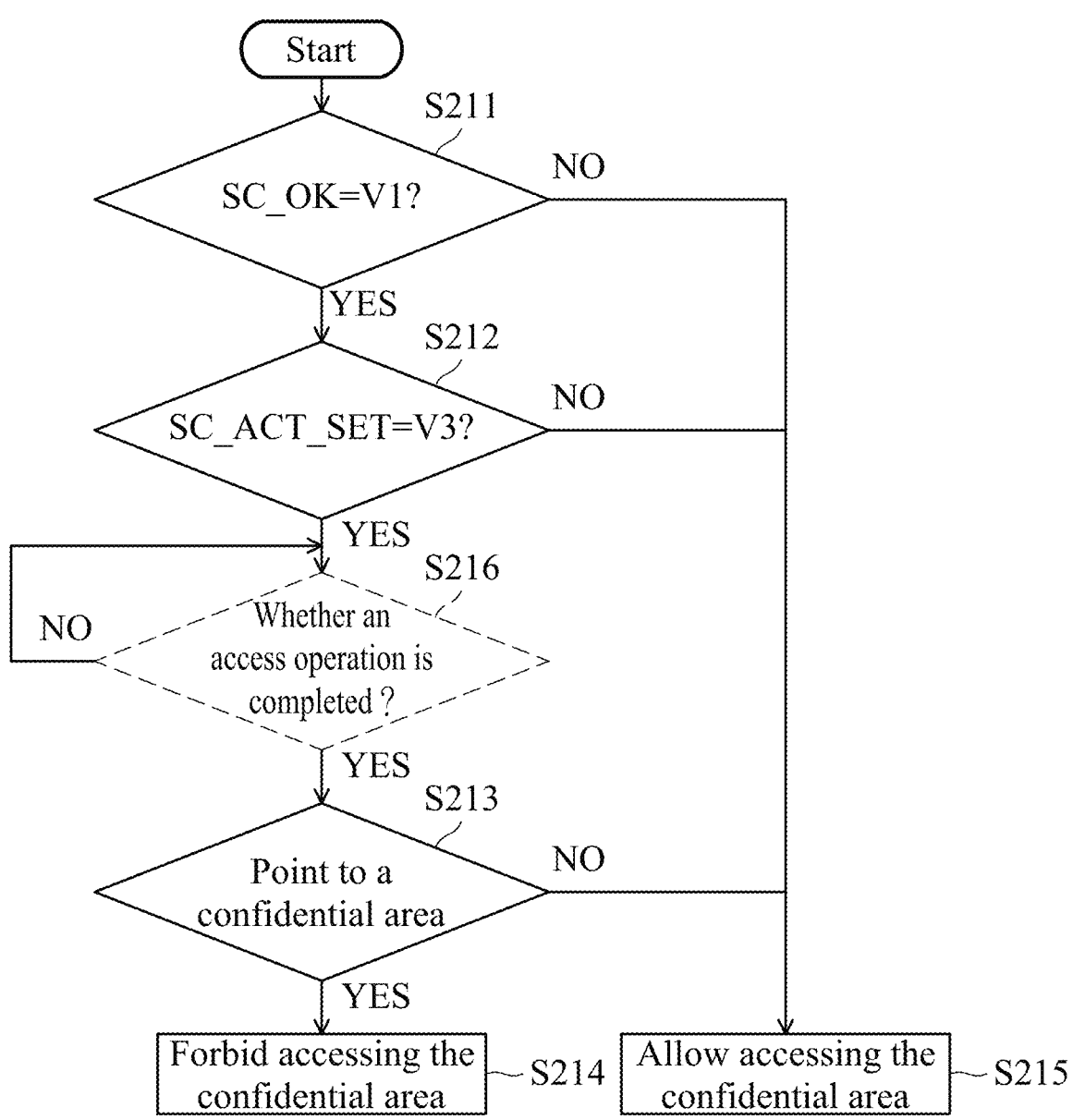
FIG. 2 is an operation flowchart of an exemplary embodiment of an arbiter determination circuit according to various aspects of the present disclosure.

FIG. 2 is an operation flowchart of an exemplary embodiment of an arbiter determination circuit according to various aspects of the present disclosure. The operating method of FIG. 2 may take the form of a program code. When the program code is loaded into and executed by a machine, the machine thereby becomes an arbiter determination circuit for practicing the operating method. First, a determination is made as to whether the activation signal SC_OK is in the first level V1 (step S211). When the activation signal SC_OK is not in the first level V1, it is determined that a secure conceal function is not selected. Therefore, the arbiter determination circuit 113 allows that the access circuit 114 accesses the memory 120 according to the access information Adr_1 (step S215). In one embodiment, the arbiter determination circuit 113 disables the activation signal SC_ACT so that the access circuit 114 accesses the memory 120.

When the activation signal SC_OK is in the first level V1, the arbiter determination circuit 113 determines whether the activation signal SC_ACT_SET is in the third level V3 (step S212). In one embodiment, the third level V3 is the same as the first level V1. When the activation signal SC_ACT_SET is not in the third level V3, it indicates that the secure conceal function is not selected. Therefore, the arbiter determination circuit 113 allows that the access circuit 114 accesses the memory 120 according to the access information Adr_1 (step S215).

When the activation signal SC_ACT_SET is in the third level V3, it indicates that the secure conceal function is selected. Therefore, the arbiter determination circuit 113 determines whether the access information Adr_1 points to a confidential area, such as the memory area 122 (step S213). When the access information Adr_1 does not point to the memory area 122, the arbiter determination circuit 113 allows that the access circuit 114 accesses the memory 120 according to the access information Adr_1 (step S215). When the access information Adr_1 points to the memory area 122, the arbiter determination circuit 113 forbids the access circuit 114 from accessing the memory area 122 (step S214). In one embodiment, the arbiter determination circuit 113 enables the activation signal SC_ACT to direct the access circuit 114 to stop accessing the memory 120. In another embodiment, the arbiter determination circuit 113 does not provide the access information Adr_1 to the access circuit 114.

In other embodiments, when the activation signal SC_ACT_SET is in the third level V3, the arbiter determination circuit 113 determines whether an access operation is completed (step S216). When the access operation is completed, the arbiter determination circuit 113 performs step S213. When the access operation has not been completed, step S216 is performed to determine whether the access operation is completed. In this embodiment, the access operation is the access operation of the processing circuit 112 in the memory area 122. When the processing circuit 112 is accessing the memory area 122, it means that the access operation has not been completed. Therefore, step S216 is performed to determine whether the processing circuit 112 has completed the access operation. When the processing circuit 112 completes the access operation of the memory area 122, the arbiter determination circuit 113 performs step S213.

In some embodiment, the arbiter determination circuit 113 determines whether a specific event occurs. When a specific event occurs, it means that the secure conceal function is released. Therefore, the arbiter determination circuit 113 directs the access circuit 114 to erase the data in the memory area 122. In one embodiment, the access circuit 114 erases all data in the memory 120. The type of the specific event is not limited in the present disclosure. In one embodiment, the specific event refers to an erasure signal being enabled. The specific event may refer to the event that the activation signal SC_ACT_SET is changed from the third level to the fourth level when the activation signal SC_OK is in the first level.

Figure 3:
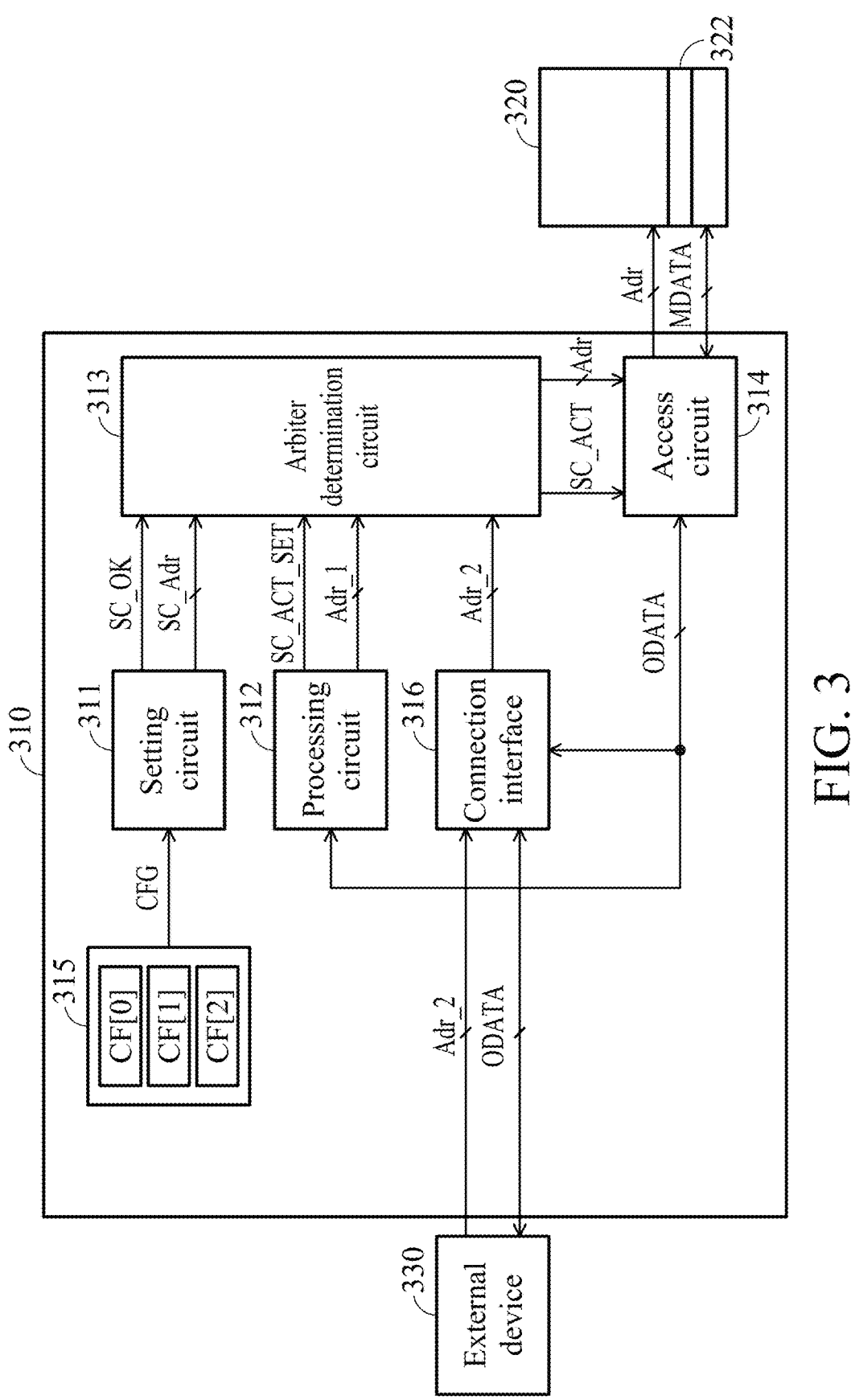
FIG. 3 is a schematic diagram of another exemplary embodiment of the operating device according to various aspects of the present disclosure.

FIG. 3 is a schematic diagram of another exemplary embodiment of the operating device according to various aspects of the present disclosure. The operating device 300 comprises a secure control circuit 310, a memory 320, and an external device 330. The external device 330 utilizes the secure control circuit 310 to access the memory 320. Since the characteristic of the memory 320 shown in FIG. 3 is similar to the characteristic of the memory 120 shown in FIG. 1, the related description is omitted here.

The secure control circuit 310 is similar to the secure control circuit 110 of FIG. 1 except form the addition of an connection interface 316. Since the characteristics of the setting circuit 311, the processing circuit 312, the access circuit 314, and the storage circuit 215 shown in FIG. 3 are similar to the characteristics of the setting circuit 111, the processing circuit 112, the access circuit 114, and the storage circuit 115 shown in FIG. 1, the related description is omitted here.

The connection interface 316 is coupled between the external device 330 and the arbiter determination circuit 313. The external device 330 sends access information Adr_2. The access information Adr_2 indicates the address of the memory 320 to be accessed. The connection interface 316 receives the access information Adr_2 and transmits the access information Adr_2 to the arbiter determination circuit 313. The kind of connection interface 316 is not limited in the present disclosure. In some embodiments, the connection interface 316 may be a USB connection port, an UART connection port, an SPI connection port, or an I2C connection port.

The arbiter determination circuit 313 determines whether to direct the access circuit 314 to access the memory 320 according to the activation signals SC_OK and SC_ACT_SET. In this embodiment, the arbiter determination circuit 313 serves the access information Adr_1 from the processing circuit 312 or the access information Adr_2 from the connection interface 316 as the access information Adr, and provides the access information Adr to the access circuit 314.

When the activation signal SC_ACT is not enabled, the access circuit 314 performs a read operation or a write operation according to the access information Adr. For example, when the access information Adr comprises a read command, the access circuit 314 reads the data MDATA of the memory 320 according to the address information of the access information Adr. In this case, the access circuit 314 processes the data MDATA to generate output data ODATA and provides the output data ODATA to the processing circuit 312 or the connection interface 316.

For example, when the access information Adr is the same as the access information Adr_1, the access circuit 314 provides the output data ODATA to the processing circuit 312. When the access information Adr is the same as the access information Adr_2, the access circuit 314 provides the output data ODATA to the connection interface 316. The connection interface 316 provides the output data ODATA to the external device 330.

When the access information Adr comprises a write command, the access circuit 314 processes the output data ODATA provided by the external device 330 or the processing circuit 312 to generate the data MDATA. The access circuit 314 writes the data MDATA to the memory 320 according to the address information of the access information Adr.

In some embodiments, when the arbiter determination circuit 313 determines that the access information Adr is an illegal access request, the arbiter determination circuit 313 enables the activation signal SC_ACT. Therefore, the access circuit 314 stops accessing the memory 320. At this time, the access circuit 314 may not provide the output data ODATA, or set the output data ODATA to a predetermined value. The predetermined value may be a series of values 0, a series of values 1, or a random code.

Figure 4:
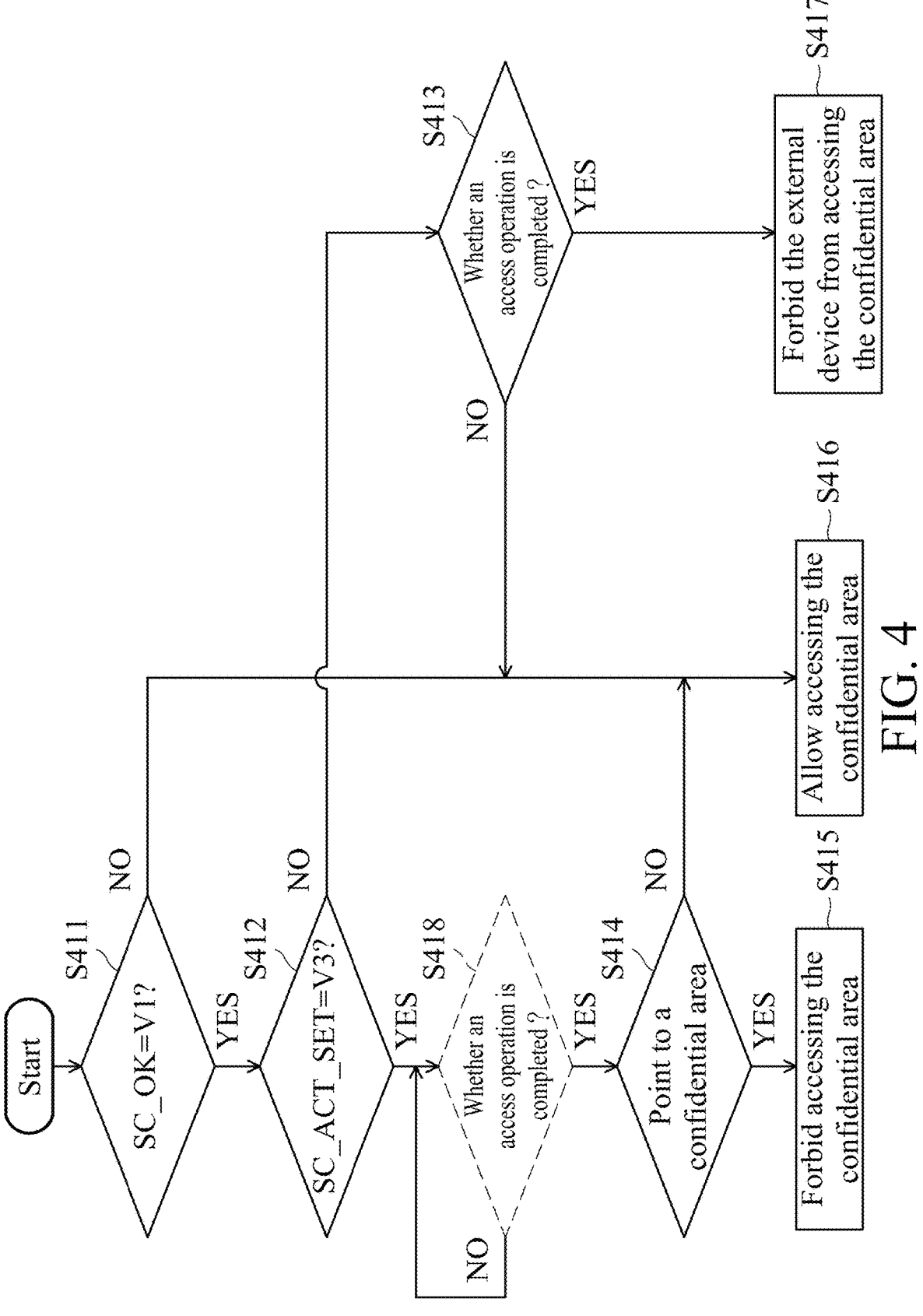
FIG. 4 is an operation flowchart of another exemplary embodiment of the arbiter determination circuit according to various aspects of the present disclosure.

FIG. 4 is an operation flowchart of another exemplary embodiment of the arbiter determination circuit 313 according to various aspects of the present disclosure. The operating method of FIG. 4 may take the form of a program code. When the program code is loaded into and executed by a machine, the machine thereby becomes an arbiter determination circuit for practicing the operating method. First, a determination is made as to whether the activation signal SC_OK is in the first level V1 (step S411). When the activation signal SC_OK is not in the first level V1, it is determined that a secure conceal function is not selected. Therefore, the arbiter determination circuit 313 allows that the access circuit 314 accesses the memory 320 according to the access information Adr (step S416). In one embodiment, the arbiter determination circuit 313 disables the activation signal SC_ACT so that the access circuit 314 accesses the memory 320.

When the activation signal SC_OK is in the first level V1, the arbiter determination circuit 313 determines whether the activation signal SC_ACT_SET is in the third level V3 (step S412). When the activation signal SC_ACT_SET is not in the third level V3, it indicates that the secure conceal function is not selected. Therefore, the arbiter determination circuit 313 determines whether the access information Adr points to a confidential area, such as the memory area 322 (step S413). When the access information Adr does not point to the memory area 322, the arbiter determination circuit 313 allows that the access circuit 314 accesses the memory 320 according to the access information Adr (step S416).

When the access information Adr points to the memory area 322, the arbiter determination circuit 313 determines that the access information Adr is provided by the processing circuit 312 or the connection interface 316. When the access information Adr is provided from the connection interface 316, the arbiter determination circuit 313 forbids the access circuit 314 from accessing the memory area 322 (step S417). In this embodiment, the arbiter determination circuit 313 forbids all external devices (e.g., the external device 330) from accessing the memory area 322. However, when the access information Adr is provided from the processing circuit 312, the arbiter determination circuit 313 allows that the access circuit 314 accesses the memory area 322 (step S417).

When the activation signal SC_ACT_SET is in the third level V3 (referred to as a specific level), it indicates that the secure conceal function is selected. Therefore, the arbiter determination circuit 313 determines whether the access information Adr points to a confidential area, such as the memory area 322 (step S414). When the access information Adr does not point to the memory area 322, the arbiter determination circuit 313 allows that the access circuit 314 accesses the memory 320 according to the access information Adr (step S416). When the access information Adr points to the memory area 322, the arbiter determination circuit 313 forbids the access circuit 314 from accessing the memory area 322 (step S415). At this time, regardless of whether the access information Adr is provided from the processing circuit 312 or the connection interface 316, the arbiter determination circuit 313 does not allow the access circuit 314 to access the memory area 322.

In other embodiments, when the activation signal SC_ACT_SET is in the third level V3, the arbiter determination circuit 313 determines whether an access operation is completed (step S418). When the access operation is completed, the arbiter determination circuit 313 performs step S414 to determine whether the access information Adr points to the memory area 322. When the access operation has not been completed, step S418 is performed to determine whether the access operation is completed. In this embodiment, the access operation is the access operation of the processing circuit 312 in the memory area 322. When the processing circuit 312 is accessing the memory area 322, it means that the access operation has not been completed. Therefore, step S418 is performed to determine whether the processing circuit 312 has completed the access operation. When the processing circuit 312 completes the access operation of the memory area 322, the arbiter determination circuit 313 performs step S414.

In some embodiment, the arbiter determination circuit 313 determines whether a specific event occurs. When a specific event occurs, it means that the secure conceal function is released. Therefore, the arbiter determination circuit 313 directs the access circuit 314 to erase the data in the memory area 322. In one embodiment, the access circuit 314 erases all data in the memory 320. The type of the specific event is not limited in the present disclosure. In one embodiment, the specific event refers to an erasure signal being enabled. The specific event may refer to the event that the activation signal SC_ACT_SET is changed from the third level to the fourth level when the activation signal SC_OK is in the first level.

Figure 5:
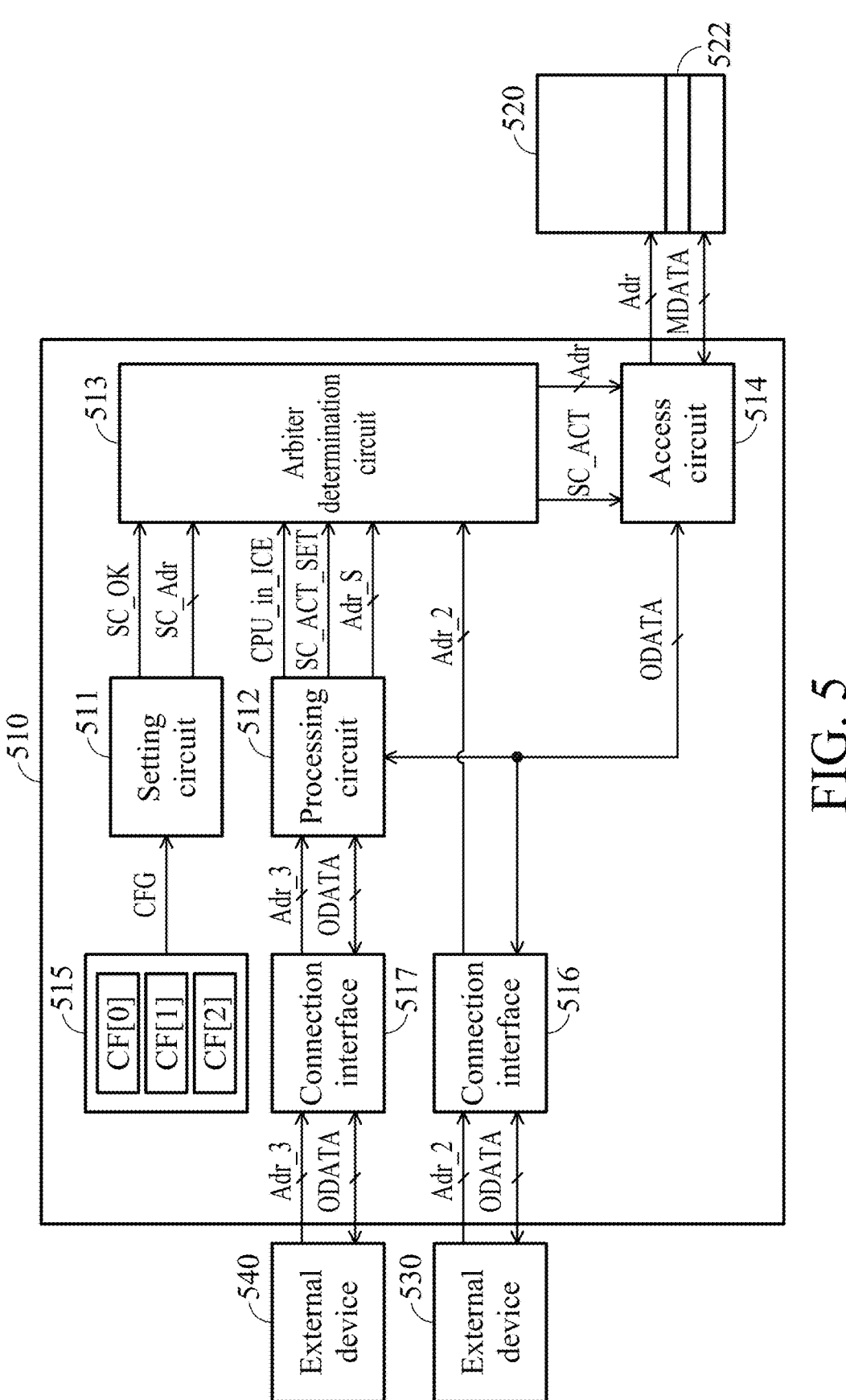
FIG. 5 is a schematic diagram of another exemplary embodiment of the operating device according to various aspects of the present disclosure.

FIG. 5 is a schematic diagram of another exemplary embodiment of the operating device according to various aspects of the present disclosure. The operating device 500 comprises secure control circuit 510, a memory 520, and external devices 530 and 540. The external devices 530 and 540 access the memory 520 via the secure control circuit 510. The kind of external device 540 is not limited in the present disclosure. In one embodiment, the external device 540 may be a debugger or an evaluation board. Since the characteristics of the memory 520 and the external device 530 shown in FIG. 5 are similar to the characteristics of the memory 320 and the external device 330 shown in FIG. 3, the related description is omitted here.

The secure control circuit 510 is similar to the secure control circuit 310 of FIG. 3 except form the addition of an connection interface 517. Since the characteristics of the setting circuit 511, the processing circuit 512, the access circuit 514, the storage circuit 515, and the connection interface 516 shown in FIG. 5 are similar to the characteristics of the setting circuit 311, the processing circuit 312, the access circuit 314, the storage circuit 315, and the connection interface 316 shown in FIG. 3, the related description is omitted here. The connection interface 517 is coupled between the external device 540 and the processing circuit 512 to transmit the access information Adr_3 from the external device 540 to the processing circuit 512 and transmit the output data ODATA between the external device 540 and the processing circuit 512. In this embodiment, the access information Adr_3 indicates which address of the memory 520 the external device 540 wants to access. The kind of connection interface 517 is not limited in the present disclosure. In some embodiments, the connection interface 517 is an in-circuit emulator (ICE) interface.

When the external device 540 is coupled to the connection interface 517, the processing circuit 512 enables a setting signal CPU_in_ICE, serves the access information Adr_3 as the access information Adr_S, and provides the access information Adr_S to the arbiter determination circuit 513. When the external device 540 is not coupled to the connection interface 517, the processing circuit 512 disables the setting signal CPU_in_ICE.

The arbiter determination circuit 513 determines whether the access information Adr_S is provided by the external device 540 according to the setting signal CPU_in_ICE. When the access information Adr_S is provided by the external device 540 and points to the confidential area 522, if the activation signal SC_OK is in the first level, the arbiter determination circuit 513 forbids the access circuit 514 from accessing the confidential area 522 according to the access information Adr even if the arbiter determination circuit 513 serves the access information Adr_S as the access information Adr and provides the access information Adr to the access circuit 514. In one embodiment, the arbiter determination circuit 513 does not provide the access information Adr to the access circuit 514.

The characteristic of the arbiter determination circuit 513 is similar to the characteristic of the arbiter determination circuit 313. Therefore, FIG. 4 is taken as an example to describe the operation of the arbiter determination circuit 513. First, a determination is made as to whether the activation signal SC_OK is in the first level V1. When the activation signal SC_OK is not in the first level V1, the arbiter determination circuit 513 allows that the access circuit 514 accesses the memory 520 according to the access information Adr (step S416).

When the activation signal SC_OK is in the first level V1, the arbiter determination circuit 513 determines whether the activation signal SC_ACT_SET is in the third level V3 (step S412). When the activation signal SC_ACT_SET is not in the third level V3, the arbiter determination circuit 513 determines whether the access information Adr points to a confidential area 522 (step S413). When the access information Adr does not point to the confidential area 522, the arbiter determination circuit 513 allows that the access circuit 514 accesses the memory 520 according to the access information Adr (step S416).

When the access information Adr points to the confidential area 522, the arbiter determination circuit 513 determines that the access information Adr is provided by the processing circuit 512, the connection interface 516, or 517. For example, when the setting signal CPU_in_ICE is disabled and the processing circuit 512 provides the access information Adr_S, it indicates that the access information Adr_S does not come from the connection interfaces 516 and 517. When the setting signal CPU_in_ICE is enabled and the processing circuit 512 provides the access information Adr_S, it indicates that the access information Adr_S is provided from the connection interface 516. When the arbiter determination circuit 513 receives the access information Adr_2, it indicates that the external device 530 wants to access the memory 520.

When the access information Adr is provided from the connection interface 516 or 517 and the access information Adr points to the confidential area 522, the arbiter determination circuit 513 forbids the access circuit 514 from accessing the confidential area 522 (step S417). However, when the access information Adr is provided from the processing circuit 512 and the access information Adr points to the confidential area 522, the arbiter determination circuit 513 allows that the access circuit 514 accesses the confidential area 522.

When the activation signal SC_ACT_SET is in the third level V3, it indicates that the secure conceal function is activated. Therefore, the arbiter determination circuit 513 determines whether the access information Adr points to the confidential area 522 (step S414). When the access information Adr does not point to the confidential area 522, the arbiter determination circuit 513 directs the access circuit 514 to access the memory 520 according to the access information Adr (step S416). When the access information Adr points to the confidential area 522, the arbiter determination circuit 513 forbids the access circuit 514 from accessing the confidential area 522 (step S415). At this time, regardless of whether the access information Adr comes from the processing circuit 512, the connection interface 516 or 517, the arbiter determination circuit 513 does not allow the access circuit 514 to access the confidential area 522. In other words, the arbiter determination circuit 513 blocks all access paths that want to access the confidential area 522.

Since the secure control circuit 510 can arbitrarily designate any memory area of the memory 520 as a confidential area and refuse to perform illegal access operations on the memory 520, the data in the confidential area can be prevented from being stolen. When the secure conceal function is released, the secure control circuit 510 simultaneously erases the data in the confidential area to achieve the most complete data protection.

It will be understood that when an element or layer is referred to as being "on", "connected to" or "coupled to"

another element or layer, it can be directly on, connected or coupled to the other element or layer or intervening elements or layers may be present. In contrast, when an element or layer is referred to as be "directly on", "directly connected to" or "directly coupled to" another element or layer, there are no intervening elements or layers present. Additionally, "enable" shall mean changing the state of a Boolean signal. Boolean signals may be enabled high or with a higher voltage, and Boolean signals may be enabled low or with a lower voltage, at the discretion of the circuit designer. Similarly, "disable" shall mean changing the state of the Boolean signal to a voltage level opposite the enabled state.

Operating methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a secure control circuit and an arbiter determination circuit for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a secure control circuit and an arbiter determination circuit for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another. In the following claims, the terms "first," "second," etc. are used merely as labels, and are not intended to impose numerical requirements on their objects.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A secure control circuit for protecting data stored in a memory, comprising:
   a setting circuit setting a first activation signal according to initial setting information and providing protection information, wherein the protection information points to a confidential area of the memory;
   a processing circuit setting a second activation signal and providing first access information;
   an arbiter determination circuit determining whether the first access information points to the confidential area according to the protection information in response to the first activation signal being in a first level; and
   an access circuit coupled between the arbiter determination circuit and the memory,
   wherein:
   in response to the second activation signal not being in a specific level and the first access information pointing to the confidential area, the arbiter determination circuit directs the access circuit to access the confidential area,
   in response to the second activation signal being in the specific level and the first access information pointing to the confidential area, the arbiter determination circuit directs the access circuit to stop accessing the confidential area,
   in response to the first activation signal being in a second level or the first access information not pointing to the confidential area, the arbiter determination circuit directs the access circuit to access the memory according to the first access information, and
   the second level is opposite to the first level.

2. The secure control circuit as claimed in claim 1, wherein in response to the second activation signal being in a third level and the first access information pointing to the confidential area, the arbiter determination circuit directs the access circuit to provide a predetermined value to the processing circuit.

3. The secure control circuit as claimed in claim 1, further comprising:
   a first connection interface coupled between a first external device and the arbiter determination circuit,
   wherein:
   in response to the first external device sending second access information, the arbiter determination circuit determines whether the second access information points to the confidential area,
   in response to the second access information pointing to the confidential area, the arbiter determination circuit directs the access circuit to stop accessing the confidential area according to the second access information.

4. The secure control circuit as claimed in claim 3, wherein in response to the second access information not pointing to the confidential area, the arbiter determination circuit directs the access circuit to access the memory according to the second access information.

5. The secure control circuit as claimed in claim 4, wherein in response to the first activation signal being in a second level, the arbiter determination circuit directs the access circuit to access the memory according to the second access information.

6. The secure control circuit as claimed in claim 4, wherein:
   in response to the access circuit accessing the memory according to the first access information, the access circuit provides first output data to the processing circuit,
   in response to the access circuit accessing the memory according to the first access information, the access circuit provides second output data to the first connection interface.

7. The secure control circuit as claimed in claim 4, wherein:
   the arbiter determination circuit determines whether to direct the access circuit to access the confidential area according to third access information according to a setting signal, and the third access information is provided by the processing circuit.

8. The secure control circuit as claimed in claim 7, further comprising:

a second connection interface coupled between a second external device and the processing circuit, wherein:

in response to the second external device being coupled to the second connection interface, the processing circuit enables the setting signal and provides the third access information from the second external device to the arbiter determination circuit, and in response to the first activation signal being in the first level and the second activation signal being in the specific level, the arbiter determination circuit determines whether the third access information points to the confidential area, in response to the third access information pointing to the confidential area, the arbiter determination circuit directs the access circuit to stop accessing the confidential area.

9. The secure control circuit as claimed in claim 1, wherein in response to the second activation signal being changed from a third level to a fourth level, the arbiter determination circuit directs the access circuit to erase the confidential area.

10. An operating device comprising:

a memory comprising a confidential area; and a secure control circuit protecting the confidential area and comprising:

a setting circuit setting a first activation signal according to initial setting information and providing protection information, wherein the protection information points to the confidential area;

a processing circuit setting a second activation signal and providing first access information;

an arbiter determination circuit determining whether the first access information points to the confidential area according to the protection information in response to the first activation signal being in a first level; and an access circuit coupled between the arbiter determination circuit and the memory, wherein:

in response to the second activation signal not being in a specific level and the first access information pointing to the confidential area, the arbiter determination circuit directs the access circuit to access the confidential area, in response to the second activation signal being in the specific level and the first access information pointing to the confidential area, the arbiter determination circuit directs the access circuit to stop accessing the confidential area, in response to the first activation signal being in a second level or the first access information not pointing to the confidential area, the arbiter determination circuit directs the access circuit to access the memory according to the first access information, and the second level is opposite to the first level.

11. The operating device as claimed in claim 10, wherein in response to the second activation signal being in a third level and the first access information pointing to the confidential area, the arbiter determination circuit directs the access circuit to provide a predetermined value to the processing circuit.

12. The operating device as claimed in claim 10, further comprising:

a first connection interface coupled between a first external device and the arbiter determination circuit, wherein:

in response to the first external device sending second access information, the arbiter determination circuit determines whether the second access information points to the confidential area, in response to the second access information pointing to the confidential area, the arbiter determination circuit directs the access circuit to stop accessing the confidential area according to the second access information.

13. The operating device as claimed in claim 12, wherein in response to the second access information not pointing to the confidential area, the arbiter determination circuit directs the access circuit to access the memory according to the second access information.

14. The operating device as claimed in claim 13, wherein in response to the first activation signal being in a second level, the arbiter determination circuit directs the access circuit to access the memory according to the second access information.

15. The operating device as claimed in claim 13, wherein:

the arbiter determination circuit determines whether to direct the access circuit to access the confidential area according to third access information according to a setting signal, and the third access information is provided by the processing circuit.

16. The operating device as claimed in claim 15, further comprising:

a second connection interface coupled between a second external device and the processing circuit, wherein:

in response to the second external device being coupled to the second connection interface, the processing circuit enables the setting signal and receives the third access information from the second external device, in response to the first activation signal being in the first level and the second activation signal being in the specific level, the arbiter determination circuit determines whether the third access information points to the confidential area, in response to the third access information pointing to the confidential area, the arbiter determination circuit directs the access circuit to stop accessing the memory.

17. The operating device as claimed in claim 10, wherein in response to the second activation signal being changed from a third level to a fourth level, the arbiter determination circuit directs the access circuit to erase the confidential area.

18. An operating method for protecting a confidential area of a memory, comprising:

determining whether a first activation signal is in a first level;

determining whether a second activation signal is in a specific level in response to the first activation signal being in the first level;

determining whether first access information points to the confidential area in response to the second activation signal not being in the specific level;

in response to determining that the first access information does not point to the confidential area, accessing the memory according to the first access information;

in response to determining that the first access information points to the confidential area and the first access information is provided by a connection interface, stopping the accessing of the memory;

in response to the first activation signal being in the first level and the second activation signal being in the specific level:

determining whether a second access information points to the confidential area;

in response to determining that the second access information points to the confidential area, stopping the accessing of the memory;

in response to determining that the second access information does not point to the confidential area, accessing the memory according to the second access information, accessing the memory according to the first access information in response to the first activation signal being in a second level or the first access information not pointing to the confidential area, wherein the second level is opposite to the first level.

* * * * *